United States Patent [19]
Papayoti

[11] 3,914,063
[45] Oct. 21, 1975

[54] SPACE FRAME CONNECTING FIXTURE
[75] Inventor: Hristo V. Papayoti, Ann Arbor, Mich.
[73] Assignee: Unistrut Corporation, Wayne, Mich.
[22] Filed: May 24, 1973
[21] Appl. No.: 363,369

[52] U.S. Cl. .................. 403/406; 52/648; 52/650; 52/658 B; 403/171; 403/176
[51] Int. Cl. ............................................ E04c 3/08
[58] Field of Search ............ 52/648, 633, 650, 651, 52/652, 655, 263, 758 B, 758 C, 758 D; 403/13, 14, 174, 173, 178, 217, 406, 347, 207, 241; 229/15; 270/21

[56] References Cited
UNITED STATES PATENTS

| | | | |
|---|---|---|---|
| 1,361,345 | 12/1920 | Ness | 52/165 |
| 1,744,125 | 1/1930 | Lane | 229/15 |
| 1,896,530 | 2/1933 | Trout | 403/174 |
| 2,312,846 | 3/1943 | Olvey | 229/15 |
| 2,979,169 | 4/1961 | Yolles | 52/655 |
| 2,986,241 | 5/1961 | Fuller | 52/655 |
| 3,049,196 | 8/1962 | Atwood | 52/648 |
| 3,055,531 | 9/1962 | Chelbor | 270/21 |
| 3,084,604 | 4/1963 | Greenhill | 52/668 |
| 3,270,478 | 9/1966 | Attwood | 46/29 |
| 3,282,615 | 11/1966 | Darby | 52/758 B |
| 3,507,526 | 4/1970 | Packman | 403/174 |

FOREIGN PATENTS OR APPLICATIONS
823,203   12/1951   Germany .......................... 403/217

OTHER PUBLICATIONS
Space Grid Structures by J. Borrego, 1968, pp. 53 and 105.

Primary Examiner—Frank L. Abbott
Assistant Examiner—Henry Raduazo
Attorney, Agent, or Firm—Gifford, Chandler & Sheridan

[57] ABSTRACT

A connecting fixture for a space frame system of the type wherein an upper chord frame structure, a lower chord frame structure and a web structure are formed of a plurality of strut members connected to each other and held together by a plurality of standardized connecting fixtures. The fixtures are in the form of an assembly including a base plate and a pair of intersecting vertical plates fitted together and in mating recesses in the base plate. The angular relationship between the horizontal and the diagonal struts is maintained with a close degree of accuracy.

4 Claims, 6 Drawing Figures

SPACE FRAME CONNECTING FIXTURE

BACKGROUND OF THE INVENTION

1. Field of the Invention

The present invention relates to building constructions and the like and, more particularly, to improved connecting fixtures for a space frame system which allow flexibility of design and reduced cost in their manufacture.

2. Description of the Prior Art

C. W. Attwood U.S. Pat. No. 3,270,478, C. W. Attwood et al. U.S. Pat. No. 3,421,280, and H. V. Papayoti U.S. Pat. No. 3,443,348, all of which patents are of common ownership herewith, disclose a standardized system of space frame construction involving the use of lightweight interchangeable elements of high quality material which may be manufactured to close tolerances and can be assembled at very low cost even by relatively inexperienced workers to form structures varying greatly in design and capable of being readily assembled, disassembled, altered or expanded to meet the changing needs of the user, the components being salvageable for new use. Such a flexible type of structural framework is well suited to many different types of buildings, pavilions, three dimensional trusses, structural spans and the like. In addition, such a structural framework meets requirements of flexibility, standardization and quality and is capable of carrying large loads. The framework can be engineered to form space enclosures of various sizes and shapes instead of being limited to certain overall fixed dimensinos, as is the case of conventional structures.

As described in the aforesaid patents, a space frame is a structure in which forces act in three or more directions in space. The structure uses four substantially standardized basic parts; namely, connecting fixtures, struts, bolts, and nuts. The essence of the four basic parts is a performed universal connecting fixture with accurate locating and securing means to which the struts are fastened by nuts and bolts. A space frame system can be applied in the assembly roof constructions as well as floors and other intermediate structures. Until the appearance on the market of space frames, known by the trademarks "UNISTRUT" and "ATTWOOD SYSTEM", three dimensional trusses and the like used in roofs, floors, ceilings and other building structures were either welded together and transported to the construction site or were assembled by welding, riveting, or bolting in the field. Specified parts which were individually adapted for one specialized use had to be altered as necessary during the progress of construction. The shortcomings, inconveniences and high cost of prior construction systems were overcome by this space frame system of construction utilizing lightweight, easily handled modular parts. Since the basic parts are manufactured in large quantities and are accurately dimensioned, the interchangeability of the parts is a prime advantage. The precision with which the parts are made in the factory assures both speed and accuracy in assembly. The parts arrive on the site prefinished and are easily joined together. It is not necessary for the workers to use tapes or squares in assembly.

SUMMARY OF THE INVENTION

The present invention which will be described subsequently in greater detail is adapted, for example, to a space frame construction with either one or a plurality of vertically disposed floor or roof structures each of which comprises a space frame system including a lower chord frame structure and an upper chord frame structure both lying in parallel and horizontally disposed planes. Intermediate stress distributing web structures serve to space and connect the lower and upper chord frame structures of each space frame system. The chord frames and web structures are formed of stress carrying channel shaped strut members interconnected at their ends by standardized connecting fixtures angularly spaced along a plurality of longitudinal and lateral rows.

The present invention more particularly comprises a novel type of connecting fixture which is made from three parts that are separately manufactured and easily assembled together in conformance with the requirements of the space frame dimensions. The three part construction of the connector fixture makes possible the fabrication of the several plates from flat metal parts and the angle at which the web struts are attached can be varied to provide for modules of different depths as required by the particular frame structure being assembled. By simply changing the angle of the aligned holes and/or lugs of the fixture relative to the base plane, it is possible to change the depth of the module. Prior art connectors formed from a single stamping of the type disclosed in the aforementioned patents presented some problems with respect to eccentricity, which problems are overcome to a large degree by the present invention. The three part assembly has its components assembled one to the other preferably by welding, with alignment tabs which provide for their accurate positioning one relative to the other in preparation for final assembly with the struts. It will further be seen that to vary the strength and load bearing capability of the space frame, it is possible to simply increase or decrease the thickness of the several plates used in the connector assembly.

Other advantages, objects and applications of the present invention will become apparent to those skilled in the art of space frame construction when the accompanying description of the present invention is read in conjunction with the accompanying drawings.

BRIEF DESCRIPTION OF THE DRAWINGS

The description herein makes reference to the accompanying drawings wherein like reference numerals refer to like parts as they may occur throughout the several views, and in which.

DETAILED DESCRIPTION

Figure 1:
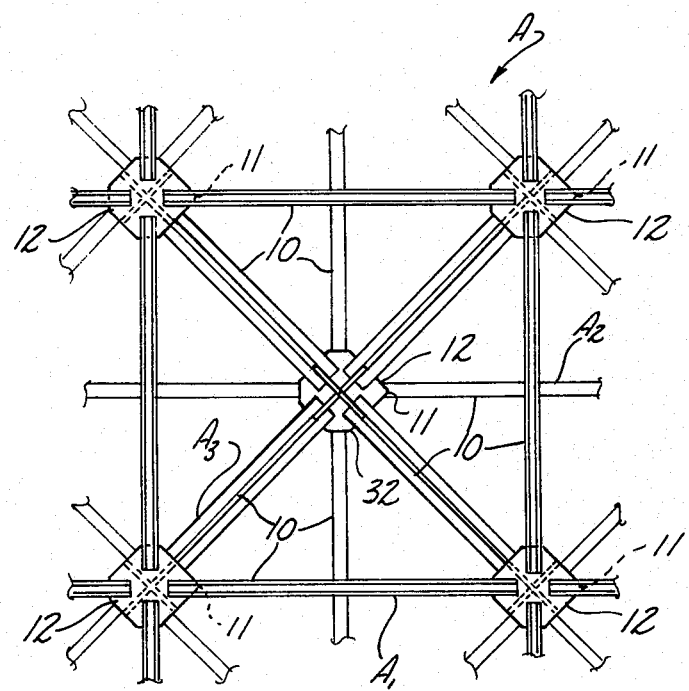
FIG. 1 is a fragmentary plan view of the top of a space frame structure including connecting fixtures constructed in accordance with the principles of the present invention.
Figure 2:
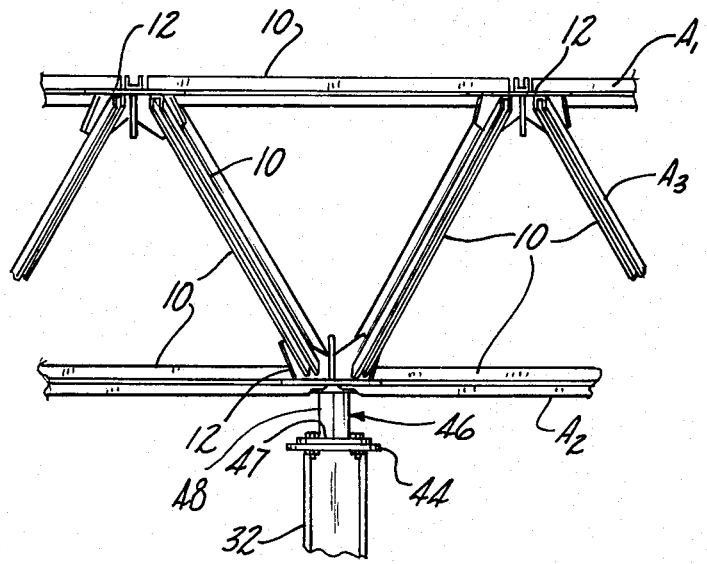
FIG. 2 is a fragmentary side elevational view of a portion of the structure illustrated in FIG. 1.

Referring now to the drawings and, more particularly to FIGS. 1 and 2, these illustrate an example of an application of a space frame construction. The space frame structure generally designated by A includes an upper chord frame structure $A_1$ and a lower chord frame structure $A_2$ held together in spatial relationship by means of an intermediate stress distributing web structure $A_3$. The upper and lower chord frame structures and the web structures are preferably assembled from a plurality of back-to-back strut members 10 which are channel shaped and are well known in the trade as being marketed under the trade name "UNISTRUT".

The upper and lower chord frame structures $A_1$ and $A_2$ further include a plurality of connecting fixtures 12, which will be shown in more complete detail in FIGS. 3–6 hereinafter. Every chord frame strut member 10 is mounted to the top or bottom surface of its respective connecting fixture 12 by means of appropriate bolt and nut fasteners. The strut members 10 must be properly aligned relative to the connecting fixtures 12. The manner by which this is accomplished will be clarified in the description of the FIG. 3 drawing. The final form of the space frame is that of an upper chord frame structure $A_1$ which lies in a plane parallel to the plane of the lower chord frame structure $A_2$, with the strut members 10 in each chord frame structure being arranged in squares, the intersection of the squares of one plane being vertically opposite the center of squares in the other plane as best shown in FIG. 1. The intersection of the squares in one plane are joined to those in the other plane by the diagonally arranged web strut members 10 forming the web structure $A_3$ such that the resulting structure consists of a plurality of four-sided pyramids set together right-side-up and up-side-down with all edges of the same length. In such a space frame arrangement, a single connecting fixture 12 can accommodate four pairs of web strut members 10 with each pair of strut members 10 being secured back-to-back to the appropriate opening of the connecting fixture 12 by a single bolt 20 and nut 22, as best shown in FIG. 3.

A preferred support column arrangement for the space frame A includes an upright W-beam (wide flange section) type column 32 suitably anchored at its lower end to a footing in the ground (not shown). The top of the upright column 32 is provided with a horizontal end face which may be the top surface of a plate 44 welded or otherwise fastened to the top of the upright column 32. The top surface of the plate 44 has a substantially short pedestal seat fixture 46 which includes a post portion 48 having a plate 47 on the bottom thereof and preferably attached to the post portion 48 by welding or the like. An upper cross-shaped seat portion of the short seat fixture 46 is provided with apertures arranged to register with the apertures formed in the base of the connecting fixture 12 and adapted to be fastened within the channel of the lower strut member 10 and to the bottom face of the seat of the connecting fixture 12 forming part of the lower chord frame structure $A_2$ by means of the same type of fastening means used for fastening thereon the lower chord frame strut member 10.

Figure 3:
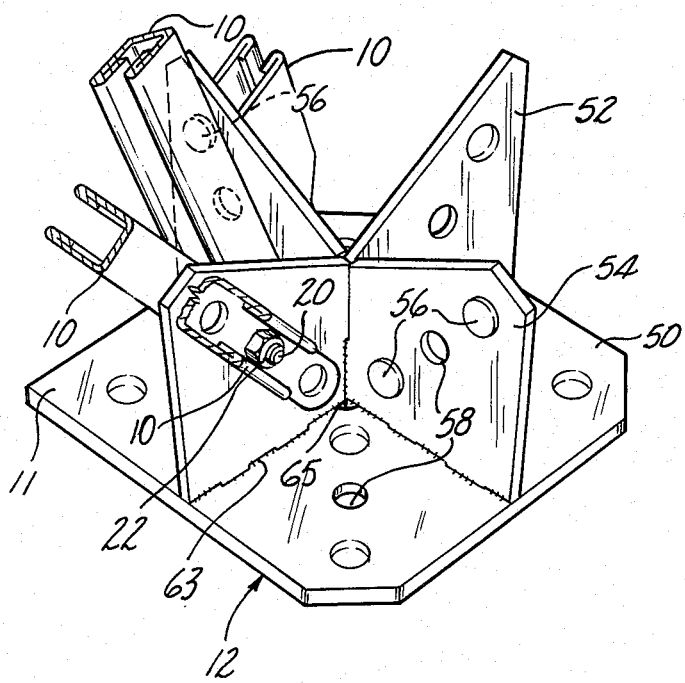
FIG. 3 is a perspective view of a connecting fixture assembly showing its relationship to the web struts connected to it.

FIG. 3 is a view to enlarged scale showing the detail of one of the connecting fixtures 12. A pair of angularly disposed web struts 10 are shown in place as they would be fastened by bolt 20 and nut 22 to the connecting fixture 12. The connecting fixture 12 is a three part assembly including a flat base plate 50 and a pair of upright plates 52 and 54. The upright plates 52 and 54 are adapted to have connected to their sides a plurality of web struts 10 in the manner shown at the left hand side of the drawing. The base plate 50 is adapted to have connected to it the struts 10 which form the chord structure $A_1$ or $A_2$ of the space frame. It will be seen that the upright plates 52 and 54 are substantially at right angles one to the other and both are at right angles to the base or chord plate 50. There also is included for each strut 10 an aligning arrangement which includes a pair of laterally extending lugs or projections 56 lying on each side of a single bolt opening 58. The left hand side of the upright plate 52 and its associated struts 10 are connected one to the other by bolt 20 and nut 22. It will be understood that the function of each pair of lugs 56 and the intermediate bolt opening 58 is first to align and then to fasten in place the struts 10 associated with each of the plates. The present invention is not limited to this hole and lug arrangement, and alternates of two holes and one lug, or all holes with multiple nuts and bolts, may be used.

Figure 4:
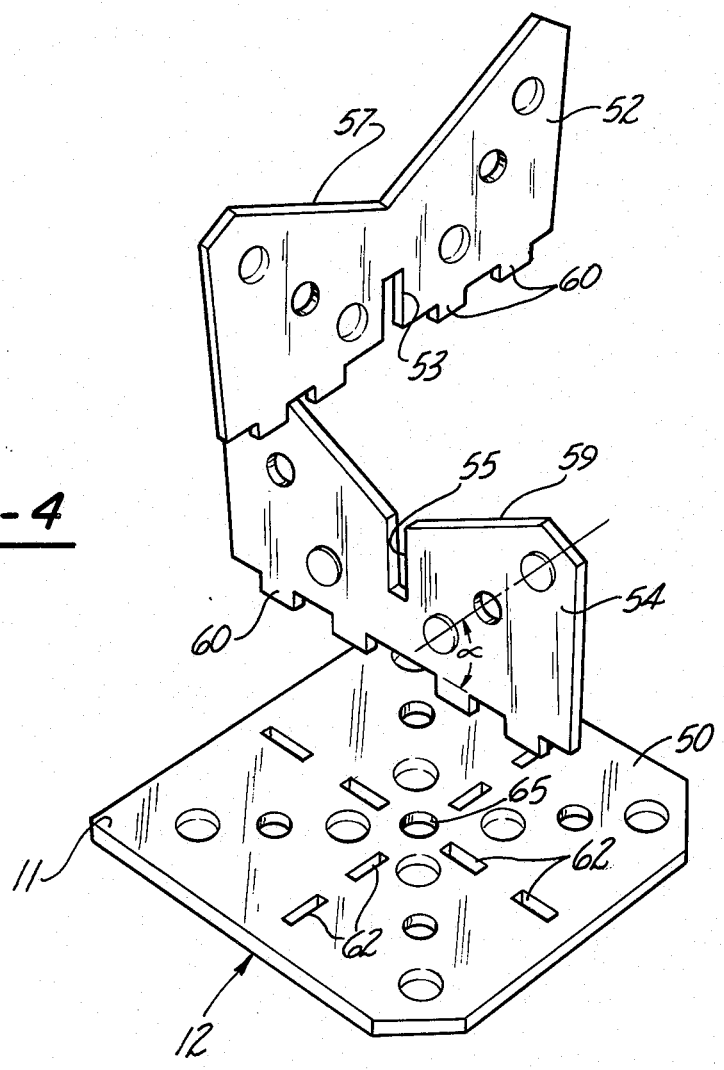
FIG. 4 is an exploded perspective view showing the three basic parts of a connecting fixture prior to their assembly.

It is of particular importance that the angles at which the struts are attached to the connecting fixtures 12 may be adjusted by simply changing the location of each linear set of holes 58 and lugs 56, that is, by altering the angle $\alpha$ as shown in FIG. 4. This makes it possible to readily change the depth of the space frame structure. Standard modules typically range from four to five feet or even greater in size — both in length and in width. In some instances such as where a multiple floor construction is used, a limited module depth may be desired to reduce the overall height of the structure. In prior art connecting fixtures of the type in which the angular faces and horizontal faces are formed from a common stamping member, it is not possible to easily change the angles to alter the module depth. Any angle change would require substantial tooling changes and costs. The connecting fixture according to the present invention involves only minor changes in the vertical plates by changing the angle $\alpha$ which represents the angle of the line of lugs and bolt openings in those plates to the horizontal. In this manner the depth of the space frame module is increased by enlarging the angle $\alpha$ or decreased by making the angle $\alpha$ smaller. By maintaining the same module size and increasing the depth, it is possible to handle larger spans and attain larger load carrying capacity. The strength of the connecting fixture 12 and, of course, the space frame itself, is dependent in part on the rigidity and strength of the plates 50, 52, and 54. These may be very easily made from thicker metal plate than can readily be formed to the fixture configurations of the prior art systems, to provide for greater strength and to accommodate larger space frame constructions. FIG. 3 illustrates the manner in which a weld may be applied along the several joints formed in the connector assembly. The weld 63 applied at the line of juncture between the vertical plates 52, 54 and the base plate 50 serves to compensate for possible warpage caused by the lower weld 61 applied at the bottom plate 50 as shown in FIG. 6.

With further reference to FIGS. 3 and 4, it will be seen that the upright plates 52 and 54 each carry at their bottom edge a set of tabs 60 which are adapted to fit in mating openings 62 provided in the base plate 50. This arrangement operates as a tongue and groove type connection to provide for the accurate alignment of the upright plates 52, 54 one relative to the other and further in relationship to the base plate 50. Also included in the upright plates 52, 54 are a pair of aligned notched and complementary cut-out portions 53 and 55, respectively, which are positioned substantially at the midpoints of the respective plates. During assembly, the two cut-out portions 53 and 55 are engaged one with the other to provide the assembled mounting arrangement shown in FIG. 3. The upright plates 52 and 54 further include at their upper edges central tapered cut-out portions 57 and 59 which provide for reduction in the weight and bulk of the parts and further allow sufficient clearance to facilitate assembly of the several parts together. The final step in completing the fixture assembly 12 is to provide the weld 63 along the intersecting seams formed between the upright plates 52, 54 and the base plate 50 as is best shown in FIGS. 3 and 6.

Figure 5:
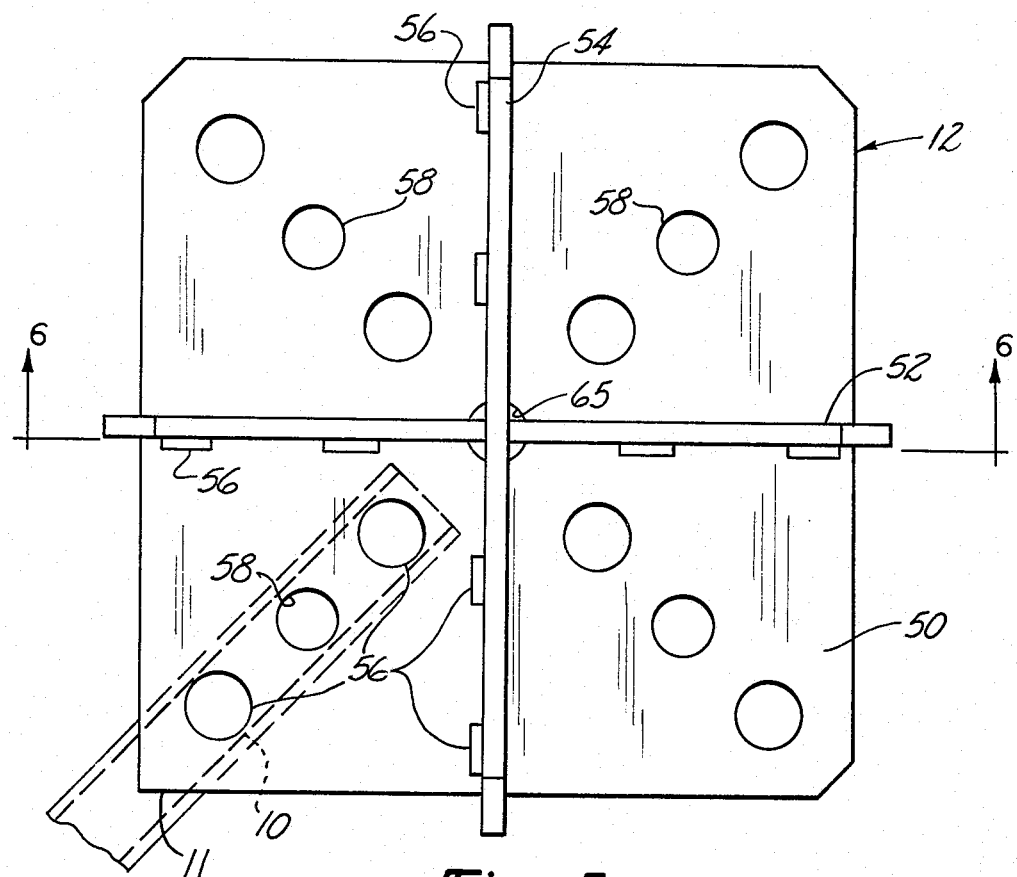
FIG. 5 is a top plan view of the finished assembly.
Figure 6:
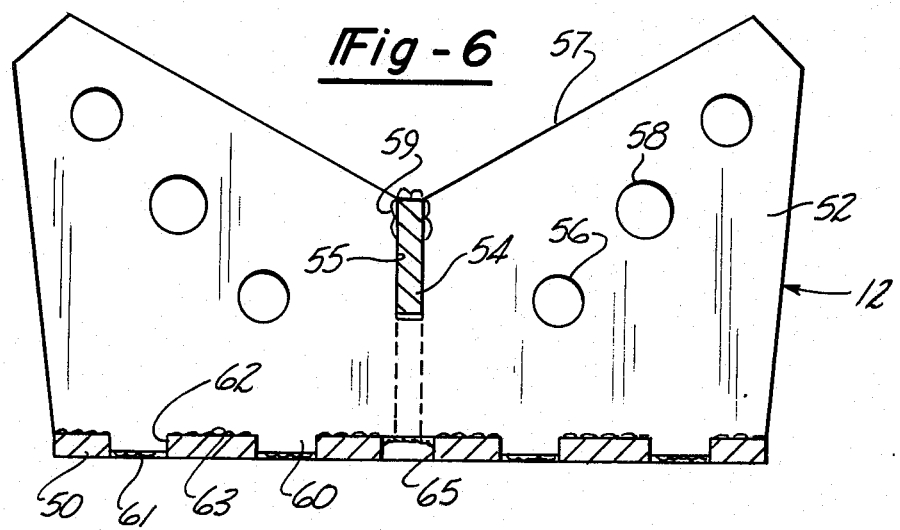
FIG. 6 is a sectional view of the assembly taken along the line 6—6 of FIG. 5.

FIGS. 5 and 6 further clarify the arrangement of the parts one relative to the other, particularly with respect to the alignment whereby the upright web strut attaching plates 52 and 54 are substantially normal one to the other and likewise normal to the base plate 50. Also illustrated is the manner in which the outwardly extending lugs 56 extend into position to engage matching apertures in each associated strut 10 as these are illustrated in the assembled position in FIG. 3. It will be seen in FIG. 5 that the lower left hand corner 11 of the base plate 50 is square, whereas the other three corners are mitered. This feature provides a standard location index for the assembly of the space frame. The square corner is opposed to the outstanding lugs 56 in both plates 52 and 54 so that all fixtures 12 and struts 10 will be correspondingly and uniformly assembled. FIG. 6 clarifies the manner in which the central cut-out portion 57 is formed in the upright plate 52. It further shows the manner in which there is a nesting arrangement between the two upright plates 52 and 54 with the notched portion 53 engaging the matching notch portion 55 formed in the other upright member of the plate 54. A weld 63 is extended over the juncture of the tow parts near their central overlapping portions. Also illustrated is the manner in which the tabs 60 formed on the bottom edges of the upright plates 52 and 54 are inserted in the opposed openings 62 formed in the base plate 50. An additional bonded or weld joint 61 may be provided between the two upright plate tabs 60 and the bottom of the base plate 50. FIG. 5 illustrates one of the chord frame struts 10 in dash line as it would appear relative to the opening 58 and the downwardly extending lugs 56 formed in the base or chord plate 50. In addition, the lugs 56 adjacent any one opening 58 may be formed to project from opposite faces of the associated plate so that two connecting struts 10 may be connected back to back at the same point, one on each face of the plate, with one lug engaging to locate one strut and the other lug engaging to locate the other strut.

It will thus become apparent that the advantages of the present invention reside in the provision of a connecting fixture for a space frame construction which is relatively economical to manufacture and simple to modify to alter the strength and the size of the space frame when necessary. By minor variations in the angular location of the shear lugs and bolt openings, it is possible to accommodate a broad range of different depths of various space frame modules.

What is claimed is as follows:

1. A connector fixture for use in a strut type space frame in which there are included a plurality of substantially horizontal chord struts and a plurality of web struts oriented in angular directions, said fixtures comprising a flat, substantially horizontal chord strut attachment base plate and a pair of upstanding, substantially right angularly disposed web strut attachment plates connected to said base plate, said pair of plates having respective cut-out portions proximate their center portions and mutually engageable one with the other, said pair of plates having formed at their lower edge a plurality of downwardly extending tab portions, said base plate further having a like plurality of apertures juxtaposed to said tab portions for receiving and holding the same in properly aligned position, and means for bonding said plates one to the other, said base plate and said pair of web strut attachment plates each having linearly arranged pairs of lugs and openings on the surfaces thereof, the lines through the centers of said linearly arranged pairs of lugs and openings intersecting at a common point, said lugs engageable with a mating opening in said struts and said openings in said plates mating with another opening in said struts to receive fastening means whereby said struts are mounted to said fixture such that extensions of their longitudinal axes intersect at a common point, the linear placement of said lugs and said openings formed in said web strut attachment plates all forming equal angles with respect to said base plate said angles being determined by; the desired depth of the resulting space frame structure.

2. The combination as set forth in claim 1 wherein said upright plates include proximate their center portions a tapered cut-out portion to further facilitate the assembly of the parts each to the other.

3. The combination as set forth in claim 1 in which one corner portion in each of said base plates is formed differently than other corner portions for locating the sides of said pair of plates carrying said lugs and said struts in a like pattern with respect to said base plates.

4. The combination as set forth in claim 1, wherein said plates are connected one to the other by a weld applied to their respective abutting surfaces.

* * * * *